United States Patent
Huang et al.

(10) Patent No.: US 12,160,729 B2
(45) Date of Patent: Dec. 3, 2024

(54) RADIO UNLICENSED (NR-U) IDLE MODE OPERATIONS

(71) Applicant: APPLE INC., Cupertino, CA (US)

(72) Inventors: Rui Huang, Beijing (CN); Yingyang Li, Beijing (CN); Zhibin Yu, Unterhaching (DE); Qiming Li, Guangdong (CN); Jie Cui, Santa Clara, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 554 days.

(21) Appl. No.: 17/310,955

(22) PCT Filed: May 2, 2020

(86) PCT No.: PCT/US2020/031216
§ 371 (c)(1),
(2) Date: Sep. 1, 2021

(87) PCT Pub. No.: WO2020/223716
PCT Pub. Date: Nov. 5, 2020

(65) Prior Publication Data
US 2022/0095189 A1 Mar. 24, 2022

Related U.S. Application Data

(60) Provisional application No. 62/842,254, filed on May 2, 2019.

(51) Int. Cl.
*H04W 36/00* (2009.01)
*H04W 36/08* (2009.01)
(Continued)

(52) U.S. Cl.
CPC ....... *H04W 36/0085* (2018.08); *H04W 36/08* (2013.01); *H04W 36/30* (2013.01);
(Continued)

(58) Field of Classification Search
CPC . H04W 36/24; H04W 36/30; H04W 36/0085; H04W 36/08; H04W 36/14;
(Continued)

(56) References Cited

U.S. PATENT DOCUMENTS

2008/0227447 A1 9/2008 Jeong et al.
2008/0285494 A1* 11/2008 Shin ................. H04W 52/0229
370/311

(Continued)

FOREIGN PATENT DOCUMENTS

CN 101584134 A 11/2009
EP 3346767 A1 * 7/2018 ............ H04W 24/08
(Continued)

OTHER PUBLICATIONS

Apple Inc., "Considerations on UE Mobility in NR-U", R2-1817470, 3GPP TSG-RAN WG2 Meeting #104, Spokane, Washington, USA, Agenda Item 11.2.2.2, Nov. 12-16, 2018, 4 pages.
(Continued)

*Primary Examiner* — Kevin D Mew
(74) *Attorney, Agent, or Firm* — Dorsey & Whitney LLP

(57) ABSTRACT

A method of a user equipment (UE) performing cell re-selection in New Radio (NR) unlicensed (NR-U) idle mode includes performing cell re-selection associated with a selected public land mobile network (PLMN) in New Radio (NR) unlicensed (NR-U) idle mode. Performing cell re-selection in NR-U idle mode further comprises determining a best cell associated with the selected PLMN based on one or more measurements. At least one of the one or more measurements may comprise a channel occupancy measurement. Performing cell re-selection in NR-U idle mode further comprises camping on the best cell and periodically searching for cells that are determined to be better than the best cell based on the one or more measurements.

20 Claims, 8 Drawing Sheets

(51) Int. Cl.
  *H04W 36/30* (2009.01)
  *H04W 48/16* (2009.01)
  *H04W 16/14* (2009.01)
  *H04W 36/24* (2009.01)
  *H04W 36/36* (2009.01)
  *H04W 84/04* (2009.01)

(52) U.S. Cl.
  CPC ............ *H04W 48/16* (2013.01); *H04W 16/14* (2013.01); *H04W 36/249* (2023.05); *H04W 36/36* (2013.01); *H04W 84/042* (2013.01)

(58) Field of Classification Search
  CPC ............ H04W 36/142; H04W 36/144; H04W 36/1446; H04W 48/16; H04W 84/042; H04W 16/14
  See application file for complete search history.

(56) References Cited

U.S. PATENT DOCUMENTS

| | | | | |
|---|---|---|---|---|
| 2011/0207453 | A1* | 8/2011 | Hsu | H04W 88/06 455/424 |
| 2012/0129536 | A1* | 5/2012 | Zou | H04W 52/146 455/422.1 |
| 2013/0053076 | A1* | 2/2013 | Chang | H04W 72/1215 455/509 |
| 2013/0079025 | A1* | 3/2013 | Chen | H04W 72/1215 455/450 |
| 2013/0343252 | A1* | 12/2013 | Chakraborty | H04W 52/0261 370/311 |
| 2017/0086225 | A1* | 3/2017 | Ljung | H04W 16/14 |
| 2017/0339629 | A1* | 11/2017 | Lindoff | H04W 76/27 |
| 2018/0359683 | A1 | 12/2018 | Rosa et al. | |
| 2019/0045559 | A1* | 2/2019 | Huang | H04B 17/318 |
| 2020/0052803 | A1* | 2/2020 | Deenoo | H04W 48/12 |
| 2020/0221372 | A1* | 7/2020 | Shih | H04W 76/25 |

FOREIGN PATENT DOCUMENTS

| | | | | |
|---|---|---|---|---|
| WO | 2008157573 A1 | 12/2008 | | |
| WO | WO-2013133630 A1 * | 9/2013 | ........ | H04W 36/0094 |
| WO | WO-2015047180 A1 * | 4/2015 | ............ | H04W 24/08 |
| WO | 2016123568 A1 | 8/2016 | | |
| WO | WO-2017082799 A1 * | 5/2017 | ............ | H04W 24/10 |
| WO | WO-2020092322 A1 * | 5/2020 | ............ | H04W 24/08 |

OTHER PUBLICATIONS

Interdigital Inc., "Idle/Inactive mobility for NR-U", R2-1814010, 3GPP TSG-RAN WG2 Meeting #103bis, Chengdu, People's Republic of China, Agenda Item 11.2.2.1, Oct. 8-12, 2018, 3 pages.

Nokia, Nokia Shanghai Bell, "Considerations on cell reselection in Idle/Inactive mode for NR-U", R2-1810218, 3GPP TSG-RAN WG2 Meeting #AH-1807, Montreal, Canada, Agenda Item 11.2, Jul. 2-6, 2018, 3 pages.

PCT/US2020/031216, International Search Report and Written Opinion, Aug. 12, 2020, 17 pages.

3GPP TS 38.304 , "3rd Generation Partnership Project; Technical Specification Group Radio Access Network; NR; User Equipment (UE) procedures in Idle mode and RRC Inactive state (Release 15)", V15.3.0, Mar. 2019, 28 pages.

Nokia, Nokia Shanghai Bell, "RRM framework and RRC connected mode mobility for NR-U", R2-1810232, 3GPP TSG- RAN WG2 Meeting #AH-1807, Montreal, Canada, Agenda Item 11.2, Jul. 2-6, 2018, 3 pages.

Interdigitial Inc., "Idle/Inactive mobility for NR-U", R2-1814010, 3GPP TSG-RAN WG2 Meeting #103bis, Chengdu, People's Republic of China, Agenda Item 11.2.2.1, Oct. 8-12, 2018, 3 pages.

* cited by examiner

RADIO UNLICENSED (NR-U) IDLE MODE OPERATIONS

CROSS-REFERENCE TO RELATED APPLICATION(S)

This application is a national stage filing under 35 U.S.C § 371 of International Patent Application No. PCT/US2020/031216 filed May 2, 2020, which claims the benefit of U.S. Provisional Application No. 62/842,254 filed May 2, 2019, each of which is hereby incorporated by reference herein in its entirety.

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover potential new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
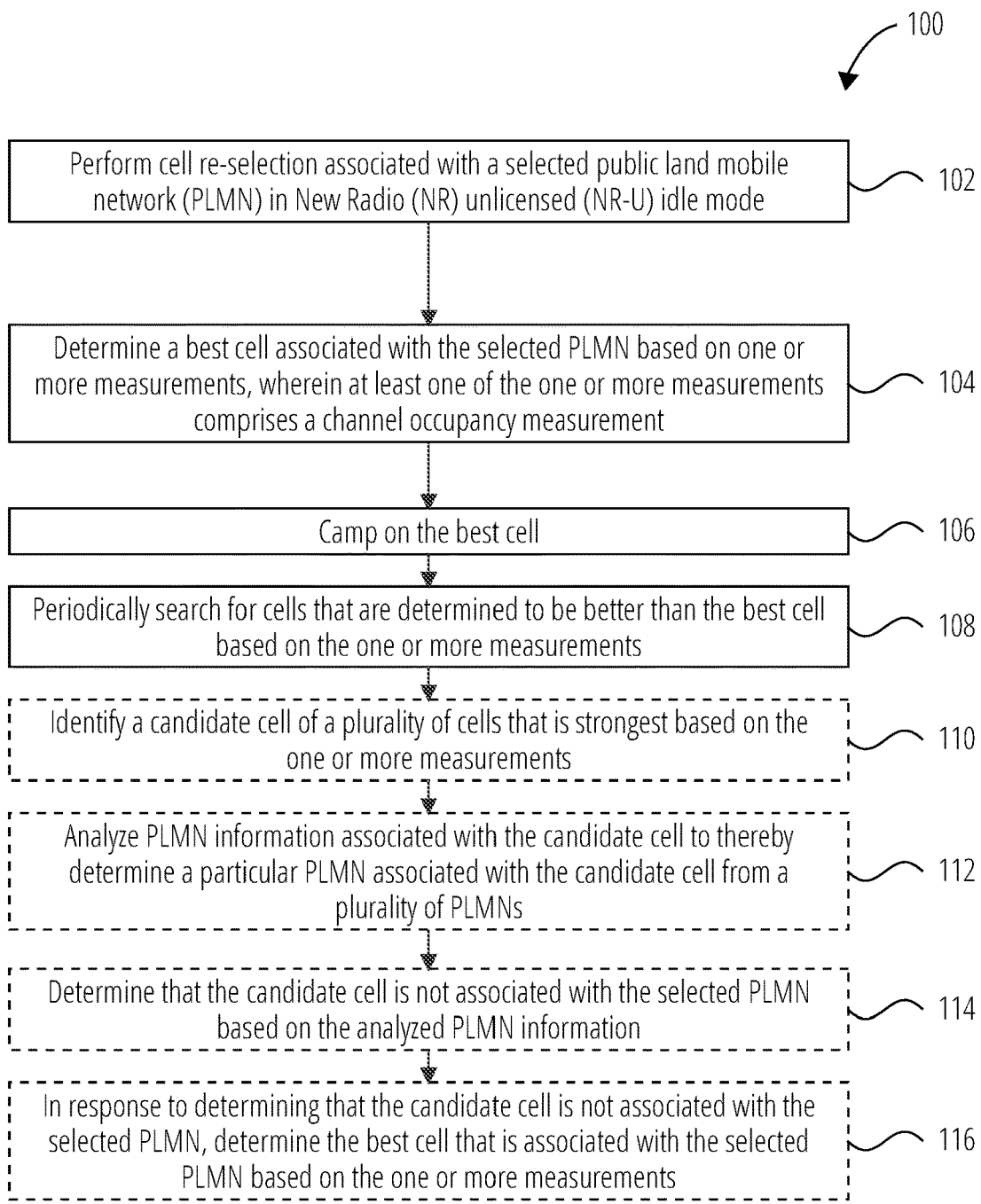
FIG. 1 illustrates a flowchart of a method in accordance with one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments herein present systems and procedures for a user equipment (UE) performing cell selection and reselection in 5G New Radio (NR) unlicensed (NR-U) idle mode.

For stand-alone NR-U, the requirements for idle mode can be specified as including: cell selection and cell reselection, which includes user equipment (UE) measurement capability and measurement and evaluation interval.

Cell Selection

In certain wireless systems, NR licensed measurement framework (cell and beam quality derivation for reference signal received power (RSRP), reference signal received quality (RSRQ), and Signal to Interference and Noise Ratio (SINR), filtering and combining multiple beams) is used as a baseline. In unlicensed bands, multiple Public Land Mobile Networks (PLMNs) can use the same carriers without any coordination. Therefore, the best cell found by a UE on a frequency may not belong to the registered PLMN. In this case, the UE may be enabled to camp on a non-best cell on a carrier if the best cell does not belong to the registered PLMN (or E-PLMN), where the non-best cell would still be the best cell of the registered PLMN.

In order to camp on the feasible cell as quick as possible, UE can use NR's cell selection criteria (Srxlev>0 AND Squal>0 as the baseline to simplify the initial cell selection as possible.

During NR-U initial cell selection, the initial cell selection can be based on the measurements same as NR (e.g., RSRP and RSRQ). In certain embodiments, as the best cell found by a UE on a frequency may not belong to the registered PLMN, the UE may also check the cell's PLMN information to make sure that it selects a cell belonging to its own PLMN; otherwise the UE will not consider the cell and choose the next candidate cell (typically the next strongest cell).

Embodiments herein may perform cell selection in NR-U, depending on cell level RSRP and RSRQ measurement same as for NR with UE autonomous checking the correct PLMN.

Cell Re-Selection

UE Measurement Capability

In a similar manner as for NR, a UE measurement capability in NR-U includes a number of NR carriers and E-UTRAN inter-RAT carriers the UE, as a minimum, is capable of monitoring.

In NR-U idle mode, the number of NR carriers and E-UTRA carriers the UE may be capable of monitoring in Idle mode can be the same as those in NR as a starting point.

In some embodiments, in the unlicensed band, there is not any restriction on the carrier deployments. For example, multiple PLMNs can use the same carriers without any coordination. Thus, the number of available carriers in the unlicensed band may be arbitrary. In other words, there may not be a requirement for the UE to support the unlicensed carriers to be monitored for NR-U idle mode.

In some embodiments, there may not be a requirement for a UE to support the unlicensed carriers to be monitored for NR-U idle mode.

Measurement and Evaluation Requirements

Regarding measurement and evaluation requirements, generally, same as LTE and NR, the cell reselection is to select a suitable cell, such that the UEs can successfully perform random access and camp on the selected cell. So, when camped on a cell, the UE may regularly search for a better cell according to the specific cell re-selection criteria.

However, in NR-U the carriers within unlicensed band can be un-planned, in which other network nodes (e.g., WiFi) can be operated. Thus, when camping on an unlicensed carrier, an NR-U UE might suffer from heavy channel load and interference from other unlicensed UEs and various other network nodes.

Notably, while camping on an unlicensed carrier, a UE may suffer from heavy channel load and interference. As a result, high channel load and occupancy can significantly increase the chance of listen-before-talk (LBT) failure, thereby increasing the delay of cell reselection. For example, in order to avoid the higher LBT failure during the cell reselection, another metric to evaluate the channel occupancy will be applied.

New measurement metric(s) may be needed when a UE evaluates the cell reselection in NR-U (e.g., the channel occupancy measured within a specified).

In other words, another measurement metric may be used when UEs evaluate the cell reselection in NR-U. The channel occupancy may be measured within a predetermined or specified duration.

Section 4.2.2.2 of 3GPP TS38.133 discusses measurement and evaluation of a serving cell. Notably, with regard to the measurement and evaluation of serving cell, the UE may measure the synchronization signal (SS)-RSRP and SS-RSRQ, Received Signal Strength Indicator (RSSI) level of the serving cell and evaluate the cell selection criterion S for the serving cell at least once every M1*N1 discontinuous reception (DRX) cycle; where: M1=2 if SSB-based measurement timing configuration (SMTC) periodicity ($T_{SMTC}$) >20 ms and discontinuous reception (DRX) cycle≤0.64 second, otherwise M1=1.

The UE may filter the SS-RSRP and SS-RSRQ measurements of the serving cell using at least 2 measurements. Within the set of measurements used for the filtering, at least two measurements may be spaced by, at least DRX cycle/2.

If the UE has evaluated according to Table 1 (see Table 4.2.2.2-1 of TS 38.133) in $N_{serv}$ consecutive DRX cycles that the serving cell does not fulfill the cell selection criterion S, the UE may initiate the measurements of all neighbor cells indicated by the serving cell, regardless of the measurement rules currently limiting UE measurement activities.

TABLE 1

| DRX cycle length [s] | Scaling Factor (N1) FR1 | FR2$^{Note1}$ | $N_{serv}$ [number of DRX cycles] |
|---|---|---|---|
| 0.32 | 1 | 8 | M1 * N1 * 4 |
| 0.64 |  | 5 | M1 * N1 * 4 |
| 1.28 |  | 4 | N1 * 2 |
| 2.56 |  | 3 | N1 * 2 |

$Note1$:

Applies for UE supporting power class 2&3&4. For UE supporting power class 1, N1 = 8 for all DRX cycle length.

For the measurements and evaluation on intra-frequency/inter-frequency neighbor cells, it is assumed that in a similar manner as for NR Idle mode. For example, SS-RSRP and SS-RSRP measurements on the neighbor cells may be performed by a UE and the UE may be able to identify the detectable neighbor cells within a specific duration. In certain embodiments, NR-U cell reselection requirements may include on or more of: 1. Cell detection time; 2. Measurement interval; and 3. Cell evaluation time.

Similarly, these NR requirements may be reused for measurement on inter-RAT E-UTRAN cell with some extension as a baseline for setting the requirements for measurements of inter-RAT NR-U cells.

Some embodiments herein may use the same requirement metric for NR standalone (SA) [see 3GPP TS38.133] cell selection for NR-U idle mode as a start point–Cell detection time ($T_{detect,NR-U\_xxx}$); Measurement interval ($T_{measure,\ NR-U\_xxx}$); and Cell evaluation time ($T_{evaluate,\ NR-U\_xxx}$).

Meanwhile, another aspect for NR radio resource management (RRM) may be beam level consideration. However, an objective of cell selection and reselection is to quickly camp on a candidate cell. That is, NR-U idle mode requirements, in certain embodiments, may only be needed for cell level, as for NR idle mode requirements.

As defined for NR, only the cell level measurement may be used when performing cell reselection, in certain embodiments the beam-level measurement may be unnecessary in NR-U idle mode measurement and evaluation requirements.

In some embodiments, in the unlicensed band, there may not be any restriction on the carrier deployments. For example, multiple PLMNs can use the same carriers without any coordination. Thus, the number of available carriers in the unlicensed band may be arbitrary. On the other hand, it may be assumed in certain embodiments that NR UE has the same capability to support the unlicensed carrier to being monitored as that for licensed carrier.

Some embodiments herein may reuse the current requirement in 3GPP TS38.133 for a UE to support both licensed and unlicensed carriers to be monitored for NR-U idle mode.

For idle mode cell re-selection purposes, in certain embodiments, the UE may be capable of monitoring at least: 1. Intra-frequency carrier; 2. Depending on UE capability, 7 NR (both licensed and unlicensed) inter-frequency carriers; 3. Depending on UE capability, 7 FDD E-UTRA inter-RAT carriers; 4. Depending on UE capability, 7 TDD E-UTRA inter-RAT carriers; and 5. Depending on UE capability, 7 NR-U inter-frequency carriers.

In addition to the requirements defined above, or in other embodiments, a UE supporting E-UTRA measurements in RRC_IDLE state may be capable of monitoring a total of at least 14 carrier frequency layers, which includes serving layer, comprising any above-defined combination of E-UTRA FDD, E-UTRA TDD and NR layers.

FIG. 1 illustrates a flowchart of a method 100 of a user equipment (UE) performing cell re-selection in New Radio (NR) unlicensed (NR-U) idle mode according to one embodiment. In block 102, the method 100 performs cell re-selection associated with a selected public land mobile network (PLMN) in New Radio (NR) unlicensed (NR-U) idle mode. In block 104, the method 100 determines a best cell associated with the selected PLMN based on one or more measurements, wherein at least one of the one or more measurements comprises a channel occupancy measurement. In block 106, the UE camps on the best cell. In block 108, the method 100 periodically searches for cells that are determined to be better than the best cell based on the one or more measurements. Notably, in certain embodiments, the acts associated with block 110 through block 116 may be associated particularly with determining a best cell associated with the selected PLMN (i.e., block 104). In block 110, the method 100 identifies a candidate cell of a plurality of cells that is strongest based on the one or more measurements. In block 112, the method 100 analyzes PLMN information associated with the candidate cell to thereby determine a particular PLMN associated with the candidate cell from a plurality of PLMNs. In block 114, the method 100 determines that the candidate cell is not associated with the selected PLMN based on the analyzed PLMN information. In block 116, the method 100, in response to determining that the candidate cell is not associated with the selected PLMN, determines the best cell that is associated with the selected PLMN based on the one or more measurements.

Figure 2:
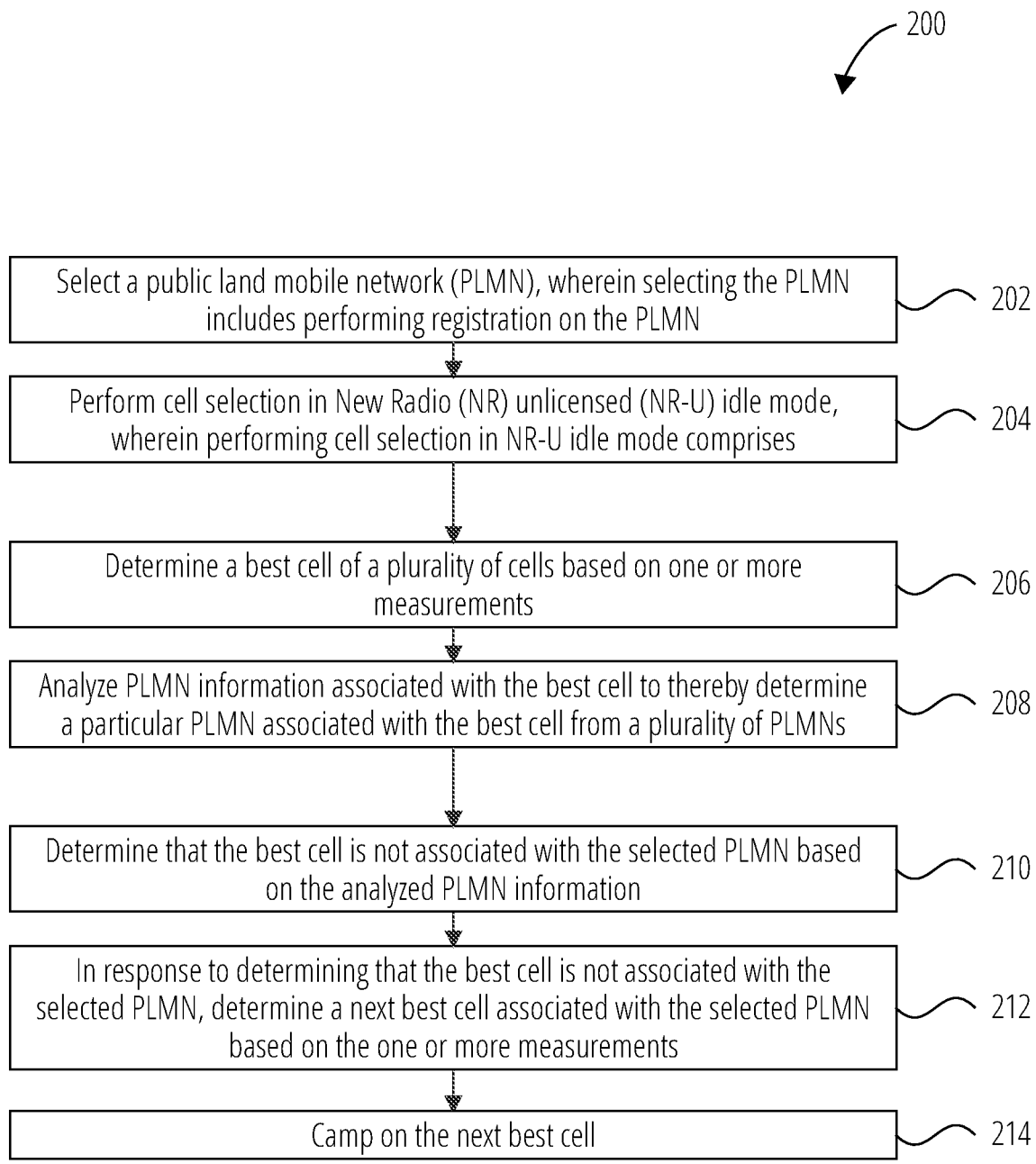
FIG. 2 illustrates a flowchart of a method in accordance with one embodiment.

FIG. 2 illustrates a flowchart of a method 200 of a user equipment (UE) performing cell selection in New Radio (NR) unlicensed (NR-U) idle mode. In block 202, the method 200 selects a public land mobile network (PLMN), wherein selecting the PLMN includes performing registration on the PLMN. In block 204, the method 200 performs cell selection in New Radio (NR) unlicensed (NR-U) idle mode. In block 206, the method 200 determines a best cell of a plurality of cells based on one or more measurements. In block 208, the method 200 analyzes PLMN information associated with the best cell to thereby determine a particular PLMN associated with the best cell from a plurality of PLMNs. In block 210, the method 200 determines that the best cell is not associated with the selected PLMN based on the analyzed PLMN information. In block 212, the method 200 in response to determining that the best cell is not associated with the selected PLMN, determines a next best cell associated with the selected PLMN based on the one or more measurements. In block 214, the UE camps on the next best cell.

Figure 3:
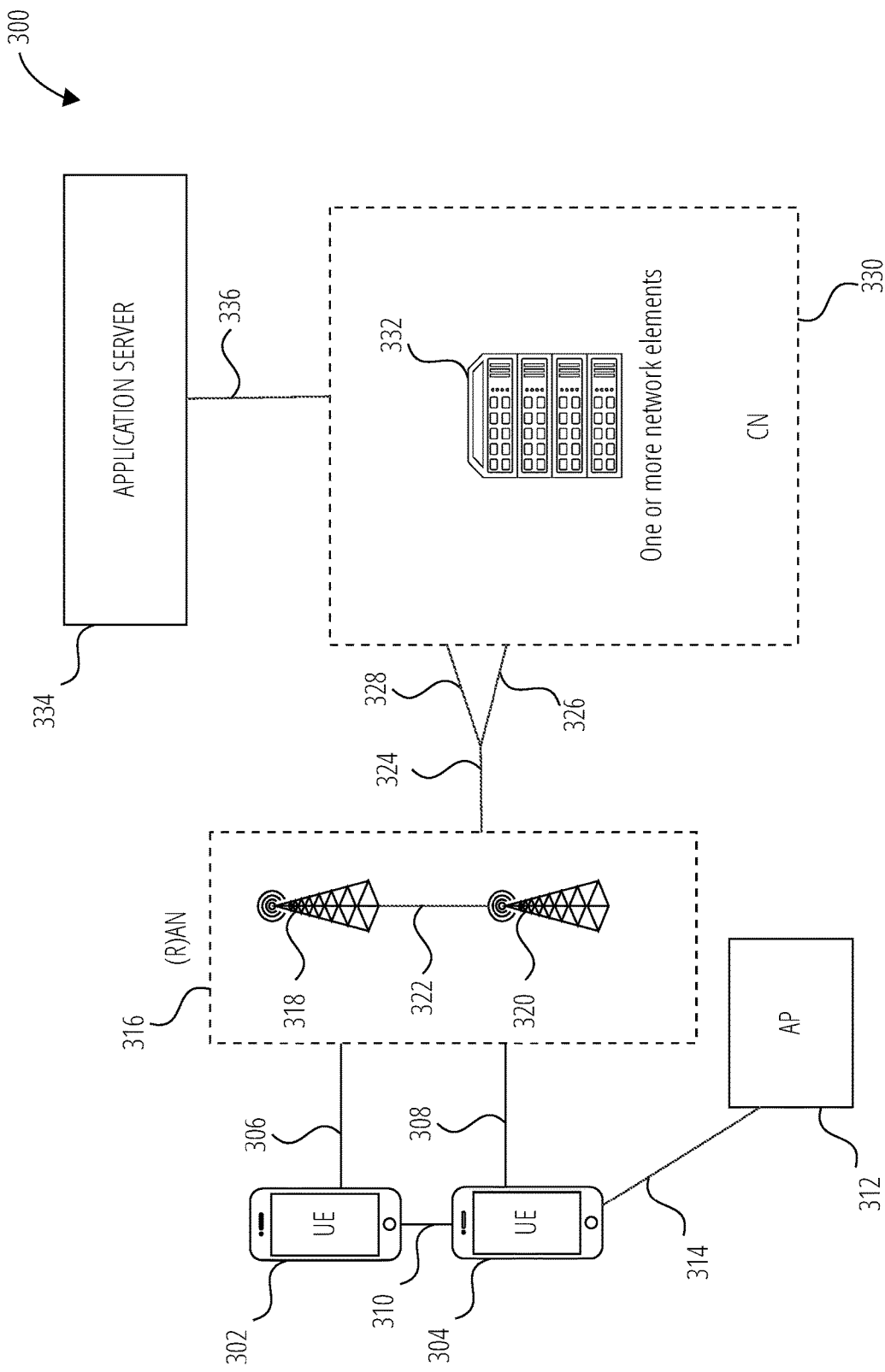
FIG. 3 illustrates a system in accordance with one embodiment.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 302 and UE 304. In this example, the UE 302 and the UE 304 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 302 and/or the UE 304 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 302 and UE 304 may be configured to connect, for example, communicatively couple, with an access node or radio access node (shown as (R)AN 316). In embodiments, the (R)AN 316 may be an NG RAN or a 5G RAN, an E-UTRAN, or a legacy RAN, such as a UTRAN or GERAN. As used herein, the term "NG RAN" or the like may refer to a (R)AN 316 that operates in an NR or 5G system, and the term "E-UTRAN" or the like may refer to a (R)AN 316 that operates in an LTE or 4G system. The UE 302 and UE 304 utilize connections (or channels) (shown as connection 306 and connection 308, respectively), each of which comprises a physical communications interface or layer (discussed in further detail below).

In this example, the connection 306 and connection 308 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 302 and UE 304 may directly exchange communication data via a ProSe interface 310. The Prose interface 310 may alternatively be referred to as a sidelink (SL) interface and may comprise one or more logical channels, including but not limited to a PSCCH, a PSSCH, a PSDCH, and a PSBCH.

The UE 304 is shown to be configured to access an AP 312 (also referred to as "WLAN node," "WLAN," "WLAN Termination," "WT" or the like) via connection 314. The connection 314 can comprise a local wireless connection, such as a connection consistent with any IEEE 802.11 protocol, wherein the AP 312 would comprise a wireless fidelity (Wi-Fi®) router. In this example, the AP 312 may be connected to the Internet without connecting to the core network of the wireless system (described in further detail below). In various embodiments, the UE 304, (R)AN 316, and AP 312 may be configured to utilize LWA operation and/or LWIP operation. The LWA operation may involve the UE 304 in RCC_CONNECTED being configured by the RAN node 318 or the RAN node 320 to utilize radio resources of LTE and WLAN. LWIP operation may involve the UE 304 using WLAN radio resources (e.g., connection 314) via IPsec protocol tunneling to authenticate and encrypt packets (e.g., IP packets) sent over the connection 314. IPsec tunneling may include encapsulating the entirety of original IP packets and adding a new packet header, thereby protecting the original header of the IP packets.

The (R)AN 316 can include one or more AN nodes, such as RAN node 318 and RAN node 320, that enable the connection 306 and connection 308. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 300 (e.g., an eNB). According to various embodiments, the RAN node 318 or RAN node 320 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 318 or RAN node 320 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RCC and PDCP layers are operated by the CRAN/vBBUP and other L2 protocol entities are operated by individual RAN nodes (e.g., RAN node 318 or RAN node 320); a MAC/PHY split wherein RRC, PDCP, RLC, and MAC layers are operated by the CRAN/vBBUP and the PHY layer is operated by individual RAN nodes (e.g., RAN node 318 or RAN node 320); or a "lower PHY" split wherein RRC, PDCP, RLC, MAC layers and upper portions of the PHY layer are operated by the CRAN/vBBUP and lower portions of the PHY layer operated by individual RAN nodes. This virtualized framework allows the freed-up processor cores of the RAN node 318 or RAN node 320 to perform other virtualized applications. In some implementations, an individual RAN node may represent individual gNB-DUs that are connected to a gNB-CU via individual F1 interfaces (not shown by FIG. 3). In these implementations, the gNB-DUs may include one or more remote radio heads or RFEMs, and the gNB-CU may be operated by a server that is located in the (R)AN 316 (not shown) or by a server pool in a similar manner as the CRAN/vBBUP. Additionally, or alternatively, one or more of the RAN node 318 or RAN node 320 may be next generation eNBs (ng-eNBs), which are RAN nodes that provide E-UTRA user plane and control plane protocol terminations toward the UE 302 and UE 304, and are connected to an SGC via an NG interface (discussed infra). In V2X scenarios one or more of the RAN node 318 or RAN node 320 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 318 and/or the RAN node 320 can terminate the air interface protocol and can be the first point of contact for the UE 302 and UE 304. In some embodiments, the RAN node 318 and/or the RAN node 320 can fulfill various logical functions for the (R)AN 316 including, but not limited to, radio network controller (RNC) functions such as radio bearer management, uplink and downlink dynamic radio resource management and data packet scheduling, and mobility management.

In embodiments, the UE 302 and UE 304 can be configured to communicate using OFDM communication signals with each other or with the RAN node 318 and/or the RAN node 320 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 318 and/or the RAN node 320 to the UE 302 and UE 304, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 302 and UE 304 and the RAN node 318 and/or the RAN node 320 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 302 and UE 304 and the RAN node 318 or RAN node 320 may operate using LAA, eLAA, and/or feLAA mechanisms. In these implementations, the UE 302 and UE 304 and the RAN node 318 or RAN node 320 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 302 and UE 304, RAN node 318 or RAN node 320, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 302, AP 312, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 302 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 302 and UE 304. The PDCCH carries information about the transport format and resource allocations related to the PDSCH channel, among other things. It may also inform the UE 302 and UE 304 about the transport format, resource allocation, and HARQ information related to the uplink shared channel. Typically, downlink scheduling (assigning control and shared channel resource blocks to the UE 304 within a cell) may be performed at any of the RAN node 318 or RAN node 320 based on channel quality information fed back from any of the UE 302 and UE 304. The downlink resource assignment information may be sent on the PDCCH used for (e.g., assigned to) each of the UE 302 and UE 304.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 318 or RAN node 320 may be configured to communicate with one another via interface 322. In embodiments where the system 300 is an LTE system (e.g., when CN 330 is an EPC), the interface 322 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 302 from an SeNB for user data; information of PDCP PDUs that were not delivered to a UE 302; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 300 is a 5G or NR system (e.g., when CN 330 is an 5GC), the interface 322 may be an Xn interface. The Xn interface is defined between two or more RAN nodes (e.g., two or more gNBs and the like) that connect to 5GC, between a RAN node 318 (e.g., a gNB) connecting to 5GC and an eNB, and/or between two eNBs connecting to 5GC (e.g., CN 330). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 302 in a connected mode (e.g., CM-CONNECTED) including functionality to manage the UE mobility for connected mode between one or more RAN node 318 or RAN node 320. The mobility support may include context transfer from an old (source) serving RAN node 318 to new (target) serving RAN node 320; and control of user plane tunnels between old (source) serving RAN node 318 to new (target) serving RAN node 320. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 316 is shown to be communicatively coupled to a core network-in this embodiment, CN 330. The CN 330 may comprise one or more network elements 332, which are configured to offer various data and telecommunications services to customers/subscribers (e.g., users of UE 302 and UE 304) who are connected to the CN 330 via the (R)AN 316. The components of the CN 330 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 330 may be referred to as a network slice, and a logical instantiation of a portion of the CN 330 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 334 may be an element offering applications that use IP bearer resources with the core network (e.g., UMTS PS domain, LTE PS data services, etc.). The application server 334 can also be configured to support one or more communication services (e.g., VoIP sessions, PTT sessions, group communication sessions, social networking services, etc.) for the UE 302 and UE 304 via the EPC. The application server 334 may communicate with the CN 330 through an IP communications interface 336.

In embodiments, the CN 330 may be an 5GC, and the (R)AN 116 may be connected with the CN 330 via an NG interface 324. In embodiments, the NG interface 324 may be split into two parts, an NG user plane (NG-U) interface 326, which carries traffic data between the RAN node 318 or RAN node 320 and a UPF, and the S1 control plane (NG-C) interface 328, which is a signaling interface between the RAN node 318 or RAN node 320 and AMFs.

In embodiments, the CN 330 may be a 5G CN, while in other embodiments, the CN 330 may be an EPC). Where CN 330 is an EPC, the (R)AN 116 may be connected with the CN 330 via an S1 interface 324. In embodiments, the S1 interface 324 may be split into two parts, an S1 user plane (S1-U) interface 326, which carries traffic data between the RAN node 318 or RAN node 320 and the S-GW, and the S1-MME interface 328, which is a signaling interface between the RAN node 318 or RAN node 320 and MMEs.

Figure 4:
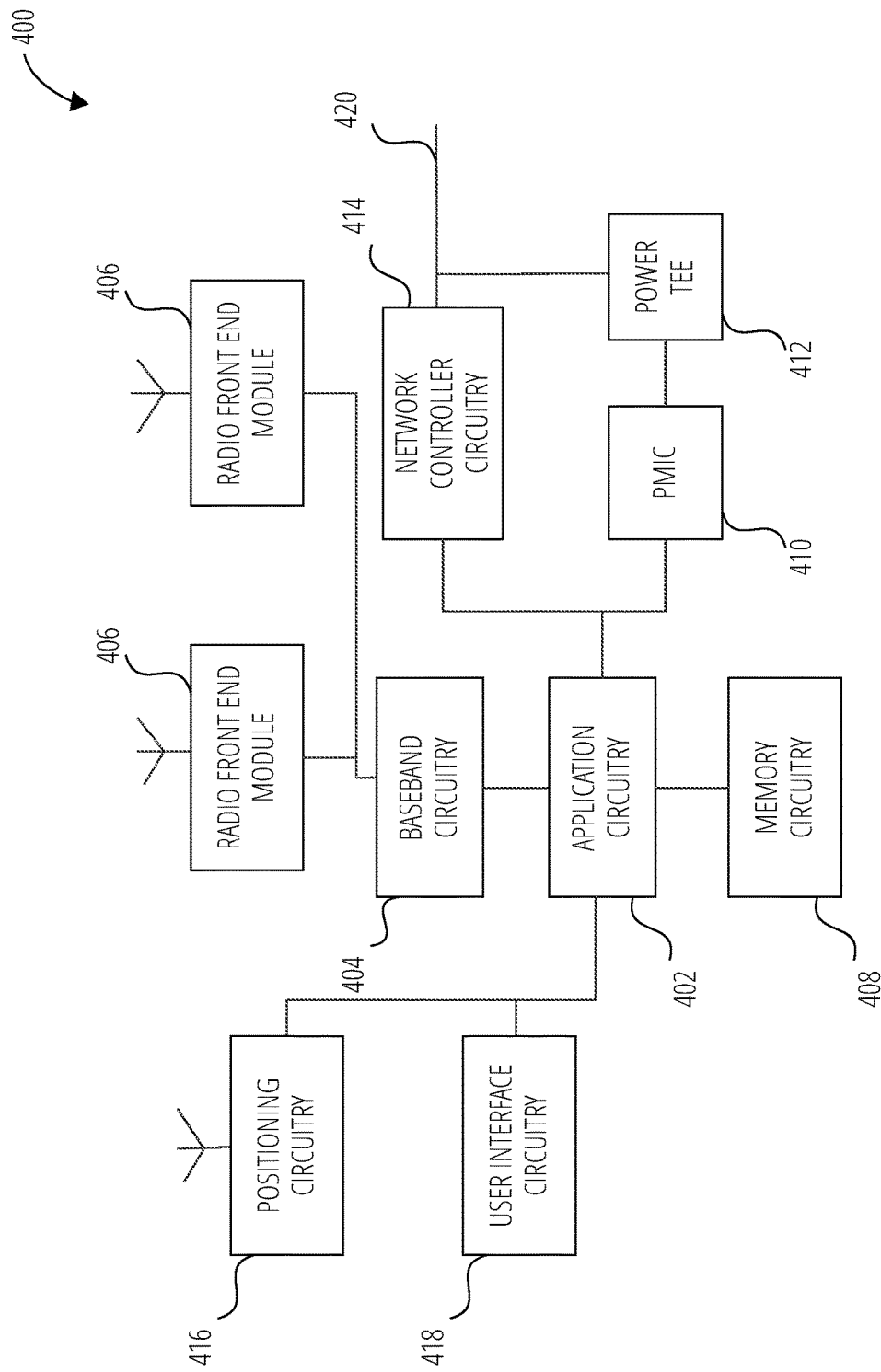
FIG. 4 illustrates an infrastructure equipment in accordance with one embodiment.

FIG. 4 illustrates an example of infrastructure equipment 400 in accordance with various embodiments. The infrastructure equipment 400 may be implemented as a base station, radio head, RAN node, AN, application server, and/or any other element/device discussed herein. In other examples, the infrastructure equipment 400 could be implemented in or by a UE.

The infrastructure equipment 400 includes application circuitry 402, baseband circuitry 404, one or more radio front end module 406 (RFEM), memory circuitry 408, power management integrated circuitry (shown as PMIC 410), power tee circuitry 412, network controller circuitry 414, network interface connector 420, satellite positioning circuitry 416, and user interface circuitry 418. In some embodiments, the device infrastructure equipment 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 402 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 402 may be coupled with or may include memory/storage elements and may be configured to execute instructions stored in the memory/storage to enable various applications or operating systems to run on the infrastructure equipment 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 402 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 402 may comprise, or may be, a special-purpose processor/controller to operate according to the various embodiments herein. As examples, the processor(s) of application circuitry 402 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 400 may not utilize application circuitry 402, and instead may include a special-purpose processor/controller to process IP data received from an EPC or 5GC, for example.

In some implementations, the application circuitry 402 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 402 may comprise logic blocks or logic fabric, and other interconnected resources that may be programmed to perform various functions, such as the procedures, methods, functions, etc. of the various embodiments discussed herein. In such embodiments, the circuitry of application circuitry 402 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like. The baseband circuitry 404 may be implemented, for example, as a solder-down substrate including one or more integrated circuits, a single packaged integrated circuit soldered to a main circuit board or a multi-chip module containing two or more integrated circuits.

The user interface circuitry 418 may include one or more user interfaces designed to enable user interaction with the infrastructure equipment 400 or peripheral component interfaces designed to enable peripheral component interaction with the infrastructure equipment 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 406, which incorporates both mmWave antennas and sub-mmWave.

The memory circuitry 408 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 408 may be implemented as one or more of solder down packaged integrated circuits, socketed memory modules and plug-in memory cards.

The PMIC 410 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 412 may provide for electrical power drawn from a network cable to provide both power supply and data connectivity to the infrastructure equipment 400 using a single cable.

The network controller circuitry 414 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 420 using a physical connection, which may be electrical (commonly referred to as a "copper interconnect"), optical, or wireless. The network controller circuitry 414 may include one or more dedicated processors and/or FPGAs to communicate using one or more of the aforementioned protocols. In some implementations, the network controller circuitry 414 may include multiple controllers to provide connectivity to other networks using the same or different protocols.

The positioning circuitry 416 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 416 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 416 may include a Micro-Technology for Positioning, Navigation, and Timing (Micro-PNT) IC that uses a master timing clock to perform position tracking/estimation without GNSS assistance. The positioning circuitry 416 may also be part of, or interact with, the baseband circuitry 404 and/or radio front end module 406 to communicate with the nodes and components of the positioning network. The positioning circuitry 416 may also provide position data and/or time data to the application circuitry 402, which may use the data to synchronize operations with various infrastructure, or the like. The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 5:
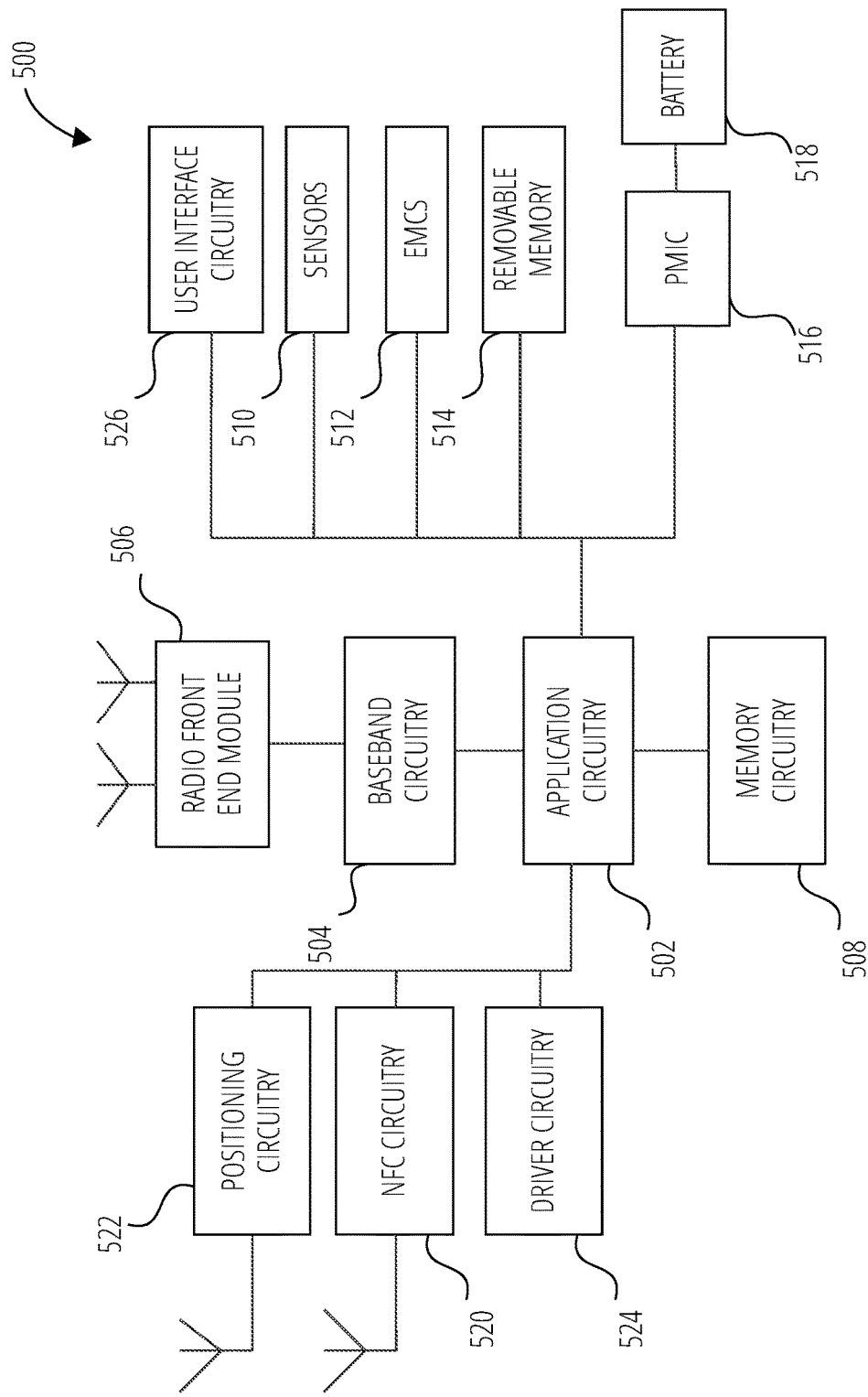
FIG. 5 illustrates a platform in accordance with one embodiment.

FIG. 5 illustrates an example of a platform 500 in accordance with various embodiments. In embodiments, the computer platform 500 may be suitable for use as UEs, application servers, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 502 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 502 may be coupled with or may include memory/storage elements and may be configured to execute instructions stored in the memory/storage to enable various applications or operating systems to run on the platform 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 502 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 502 may comprise, or may be, a special-purpose processor/controller to operate according to the various embodiments herein.

As examples, the processor(s) of application circuitry 502 may include an Intel® Architecture Core™ based processor, such as a Quark™, an Atom™, an i3, an i5, an i7, or an MCU-class processor, or another such processor available from Intel® Corporation. The processors of the application circuitry 502 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 502 may be a part of a system on a chip (SoC) in which the application circuitry 502 and other components are formed into a single integrated circuit, or a single package, such as the Edison™ or Galileo™ SoC boards from Intel® Corporation.

Additionally or alternatively, application circuitry 502 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 502 may comprise logic blocks or logic fabric, and other interconnected resources that may be programmed to perform various functions, such as the procedures, methods, functions, etc. of the various embodiments discussed herein. In such embodiments, the circuitry of application circuitry 502 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 504 may be implemented, for example, as a solder-down substrate including one or more integrated circuits, a single packaged integrated circuit soldered to a main circuit board or a multi-chip module containing two or more integrated circuits.

The radio front end module 506 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 506, which incorporates both mmWave antennas and sub-mmWave.

The memory circuitry 508 may include any number and type of memory devices used to provide for a given amount of system memory. As examples, the memory circuitry 508 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 508 may be developed in accordance with a Joint Electron Devices Engineering Council (JEDEC) low power double data rate (LPDDR)-based design, such as LPDDR2, LPDDR3, LPDDR4, or the like. Memory circuitry 508 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 508 maybe on-die memory or registers associated with the application circuitry 502. To provide for persistent storage of information such as data, applications, operating systems and so forth, memory circuitry 508 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 500 may incorporate the three-dimensional (3D) cross-point (XPOINT) memories from Intel® and Micron®.

The removable memory 514 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensors 510 and electro-mechanical components (shown as EMCs 512), as well as removable memory devices coupled to removable memory 514.

The sensors 510 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lenseless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 512 include devices, modules, or subsystems whose purpose is to enable platform 500 to change its state, position, and/or orientation, or move or control a mechanism or (sub)system. Additionally, EMCs 512 may be configured to generate and send messages/signaling to other components of the platform 500 to indicate a current state of the EMCs 512. Examples of the EMCs 512 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 512 based on one or more captured events and/or instructions or control signals received from a service provider and/or various clients. In some implementations, the interface circuitry may connect the platform 500 with positioning circuitry 522. The positioning circuitry 522 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 522 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 522 may include a Micro-PNT IC that uses a master timing clock to perform position tracking/estimation without GNSS assistance. The positioning circuitry 522 may also be part of, or interact with, the baseband circuitry 504 and/or radio front end module 506 to communicate with the nodes and components of the positioning network. The positioning circuitry 522 may also provide position data and/or time data to the application circuitry 502, which may use the data to synchronize operations with various infrastructure (e.g., radio base stations), for turn-by-turn navigation applications, or the like.

In some implementations, the interface circuitry may connect the platform 500 with Near-Field Communication circuitry (shown as NFC circuitry 520). The NFC circuitry 520 is configured to provide contactless, short-range communications based on radio frequency identification (RFID) standards, wherein magnetic field induction is used to enable communication between NFC circuitry 520 and NFC-enabled devices external to the platform 500 (e.g., an "NFC touchpoint"). NFC circuitry 520 comprises an NFC controller coupled with an antenna element and a processor coupled with the NFC controller. The NFC controller may be a chip/IC providing NFC functionalities to the NFC circuitry 520 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 520, or initiate data transfer between the NFC circuitry 520 and another active NFC device (e.g., a smartphone or an NFC-enabled POS terminal) that is proximate to the platform 500.

The driver circuitry 524 may include software and hardware elements that operate to control particular devices that are embedded in the platform 500, attached to the platform 500, or otherwise communicatively coupled with the platform 500. The driver circuitry 524 may include individual drivers allowing other components of the platform 500 to interact with or control various input/output (I/O) devices that may be present within, or connected to, the platform 500. For example, driver circuitry 524 may include a display driver to control and allow access to a display device, a touchscreen driver to control and allow access to a touchscreen interface of the platform 500, sensor drivers to obtain sensor readings of sensors 510 and control and allow access to sensors 510, EMC drivers to obtain actuator positions of the EMCs 512 and/or control and allow access to the EMCs 512, a camera driver to control and allow access to an embedded image capture device, audio drivers to control and allow access to one or more audio devices.

The power management integrated circuitry (shown as PMIC 516) (also referred to as "power management circuitry") may manage power provided to various components of the platform 500. In particular, with respect to the baseband circuitry 504, the PMIC 516 may control power-source selection, voltage scaling, battery charging, or DC-to-DC conversion. The PMIC 516 may often be included when the platform 500 is capable of being powered by a battery 518, for example, when the device is included in a UE.

In some embodiments, the PMIC 516 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 518 may power the platform 500, although in some examples the platform 500 may be mounted deployed in a fixed location, and may have a power supply coupled to an electrical grid. The battery 518 may be a lithium ion battery, a metal-air battery, such as a zinc-air battery, an aluminum-air battery, a lithium-air battery, and the like. In some implementations, such as in V2X applications, the battery 518 may be a typical lead-acid automotive battery.

In some implementations, the battery 518 may be a "smart battery," which includes or is coupled with a Battery Management System (BMS) or battery monitoring integrated circuitry. The BMS may be included in the platform 500 to track the state of charge (SoCh) of the battery 518. The BMS may be used to monitor other parameters of the battery 518 to provide failure predictions, such as the state of health (SoH) and the state of function (SoF) of the battery 518. The BMS may communicate the information of the battery 518 to the application circuitry 502 or other components of the platform 500. The BMS may also include an analog-to-digital (ADC) converter that allows the application circuitry 502 to directly monitor the voltage of the battery 518 or the current flow from the battery 518. The battery parameters may be used to determine actions that the platform 500 may perform, such as transmission frequency, network operation, sensing frequency, and the like.

A power block, or other power supply coupled to an electrical grid may be coupled with the BMS to charge the battery 518. In some examples, the power block may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 518, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 526 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 526 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensors 510 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 6:
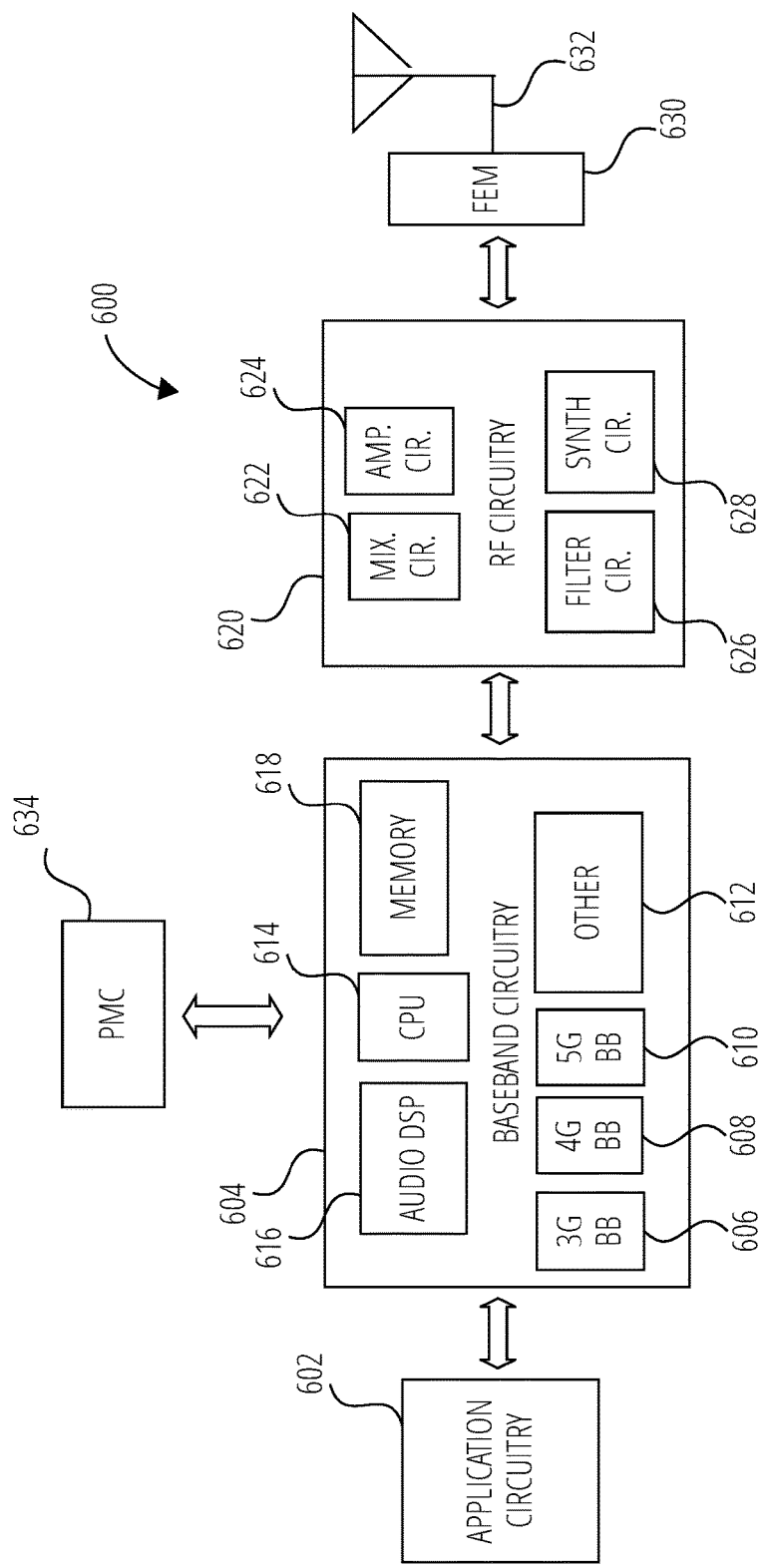
FIG. 6 illustrates a device in accordance with one embodiment.

FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing Unit (CPU 614). The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 620 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the filter circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional-N synthesizer or a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one or more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a UE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
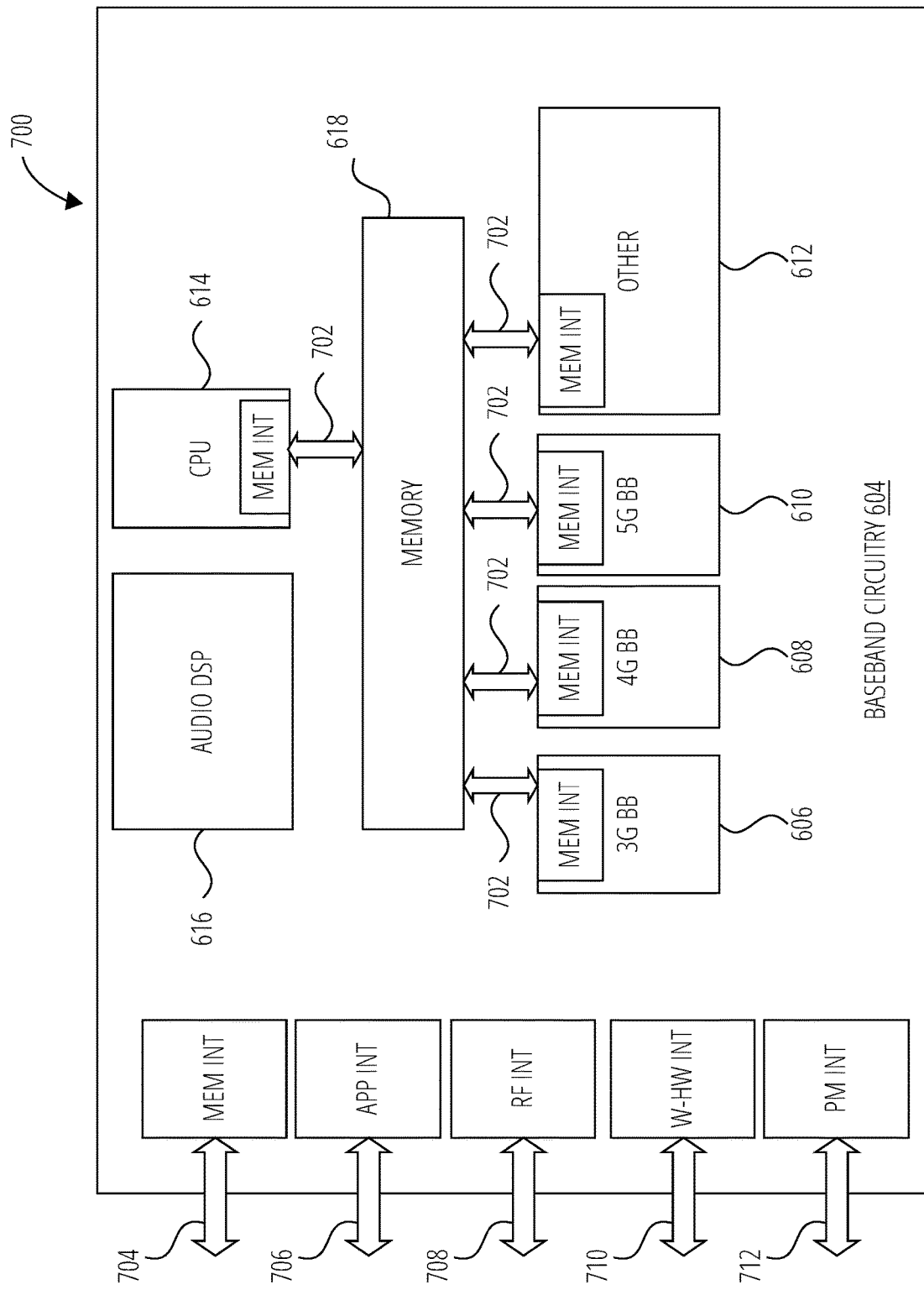
FIG. 7 illustrates example interfaces in accordance with one embodiment.

FIG. 7 illustrates example interfaces 700 of baseband circuitry in accordance with some embodiments. As discussed above, the baseband circuitry 604 of FIG. 6 may comprise 3G baseband processor 606, 4G baseband processor 608, 5G baseband processor 610, other baseband processor(s) 612, CPU 614, and a memory 618 utilized by said processors. As illustrated, each of the processors may include a respective memory interface 702 to send/receive data to/from the memory 618.

The baseband circuitry 604 may further include one or more interfaces to communicatively couple to other circuitries/devices, such as a memory interface 704 (e.g., an interface to send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi® components, and other communication components), and a power management interface 712 (e.g., an interface to send/receive power or control signals to/from the PMC 634.

Figure 8:
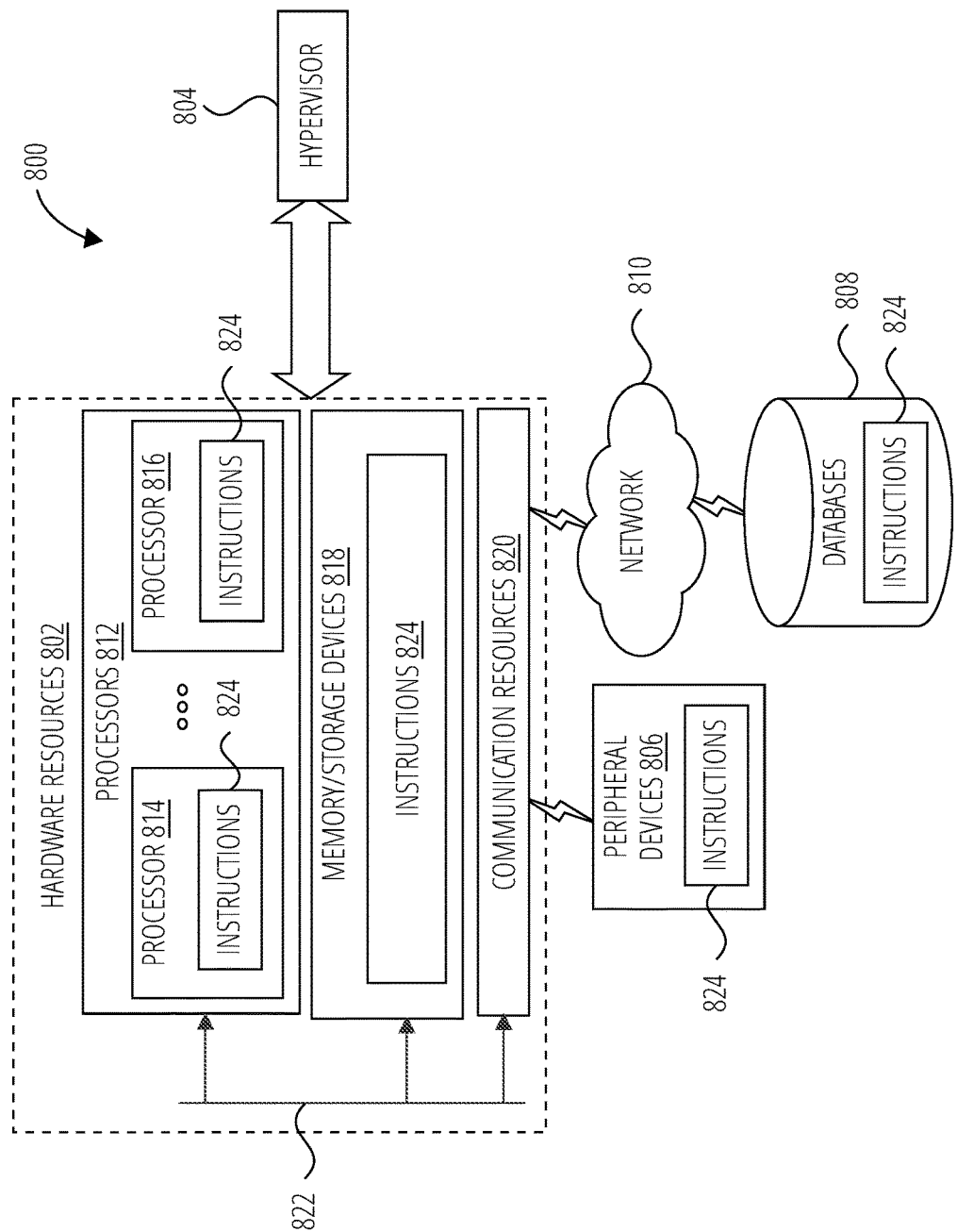
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Procedures

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1A may include the an apparatus of a user equipment (UE), comprising: one or more processors configured to: perform cell re-selection associated with a selected public land mobile network (PLMN) in New Radio (NR) unlicensed (NR-U) idle mode, wherein performing cell re-selection in NR-U idle mode comprises to: determine a best cell associated with the selected PLMN based on one or more measurements, wherein at least one of the one or more measurements comprises a channel occupancy measurement; camp on the best cell; and periodically search for cells that are determined to be better than the best cell based on the one or more measurements; and a memory configured to store information associated with performing cell re-selection.

Example 2A may include the apparatus of example 1A, wherein determining the best cell associated with the selected PLMN comprises to: identify a candidate cell of a plurality of cells that is strongest based on the one or more measurements; analyze PLMN information associated with the candidate cell to thereby determine a particular PLMN associated with the candidate cell from a plurality of PLMNs; determine that the candidate cell is not associated with the selected PLMN based on the analyzed PLMN information; and in response to determining that the candidate cell is not associated with the selected PLMN, determine the best cell that is associated with the selected PLMN based on the one or more measurements.

Example 3A may include the apparatus of example 1A, wherein the channel occupancy measurement is performed within a specified duration.

Example 4A may include the apparatus of example 1A, wherein the one or more measurements include one or more of a synchronization signal reference signal received power (SS-RSRP) and synchronization signal reference signal received quality (SS-RSRQ).

Example 5A may include the apparatus of example 1A, wherein the one or more processors are further configured to determine whether the best cell fulfills a cell selection criterion during camping.

Example 6A may include the apparatus of example 5A, wherein the one or more processors are further configured to, in response to determining that the best cell does not fulfill the cell selection criterion, measure one or more neighbor cells regardless of any measurement rules that limit measurement activities of the UE.

Example 7A may include the apparatus of example 1A, wherein searching for cells that are determined to be better than the best cell based on the one or more measurements comprises evaluating neighbor cells to the best cell.

Example 8A may include the apparatus of example 7A, wherein evaluating neighbor cells includes consideration of at least one of cell detection time, measurement interval, and cell evaluation time.

Example 9A may include the apparatus of example 7A, wherein the one or more processors are further configured to monitor intra-frequency carriers, inter-frequency carriers, frequency-division duplexing (FDD) evolved universal mobile telecommunications system (UMTS) terrestrial radio access (E-UTRA) inter-radio access technology (RAT) carriers, and time-division duplexing (TDD) E-UTRA inter-RAT carriers.

Example 10A may include a computer-readable storage medium, the computer-readable storage medium including instructions that when executed by a processor of a user equipment (UE) configured to perform cell re-selection, cause the processor to: perform cell re-selection associated with a selected public land mobile network (PLMN) in New Radio (NR) unlicensed (NR-U) idle mode, wherein performing cell re-selection in NR-U idle mode comprises to: determine a best cell associated with the selected PLMN based on one or more measurements, wherein at least one of the one or more measurements comprises a channel occupancy measurement; camp on the best cell; and periodically search for cells that are determined to be better than the best cell based on the one or more measurements.

Example 11A may include the computer-readable storage medium of example 10A, wherein determining the best cell associated with the selected PLMN comprises to: identify a candidate cell of a plurality of cells that is strongest based on the one or more measurements; analyze PLMN information associated with the candidate cell to thereby determine a particular PLMN associated with the candidate cell from a plurality of PLMNs; determine that the candidate cell is not associated with the selected PLMN based on the analyzed PLMN information; and in response to determining that the candidate cell is not associated with the selected PLMN, determine the best cell that is associated with the selected PLMN based on the one or more measurements.

Example 12A may include the computer-readable storage medium of example 10A, wherein the channel occupancy measurement is performed within a specified duration.

Example 13A may include the computer-readable storage medium of example 10A, wherein the one or more measurements include one or more of a synchronization signal reference signal received power (SS-RSRP), a synchronization signal reference signal received quality (SS-RSRQ), and a signal to interference and noise ratio (SINR).

Example 14A may include the computer-readable storage medium of example 10A, wherein the instructions further configure the processor to determine whether the best cell fulfills a cell selection criterion during camping.

Example 15A may include the computer-readable storage medium of example 14A, wherein the instructions further configure the processor to, in response to determining that the best cell does not fulfill the cell selection criterion, measure one or more neighbor cells regardless of any measurement rules that limit measurement activities of the UE.

Example 16A may include the computer-readable storage medium of example 10A wherein searching for cells that are determined to be better than the best cell based on the one or more measurements comprises evaluating neighbor cells to the best cell.

Example 17A may include the computer-readable storage medium of example 16A, wherein evaluating neighbor cells includes consideration of at least one of cell detection time, measurement interval, and cell evaluation time.

Example 18A may include the computer-readable storage medium of example 16A, wherein the instructions further configure the processor to monitor intra-frequency carriers, inter-frequency carriers, frequency-division duplexing (FDD) evolved universal mobile telecommunications system (UMTS) terrestrial radio access (E-UTRA) inter-radio access technology (RAT) carriers, and time-division duplexing (TDD) E-UTRA inter-RAT carriers.

Example 19A may include a method of a user equipment (UE) performing cell re-selection, the method comprising: performing cell re-selection associated with a selected public land mobile network (PLMN) in New Radio (NR) unlicensed (NR-U) idle mode, wherein performing cell re-selection in NR-U idle mode comprises: determining a best cell associated with the selected PLMN based on one or more measurements, wherein at least one of the one or more measurements comprises a channel occupancy measurement; camping on the best cell; and periodically searching for cells that are determined to be better than the best cell based on the one or more measurements.

Example 20A may include the method of example 19A, wherein determining the best cell associated with the selected PLMN further comprises: identifying a candidate cell of a plurality of cells that is strongest based on the one or more measurements; analyzing PLMN information associated with the candidate cell to thereby determine a particular PLMN associated with the candidate cell from a plurality of PLMNs; determining that the candidate cell is not associated with the selected PLMN based on the analyzed PLMN information; and in response to determining that the candidate cell is not associated with the selected PLMN, determining the best cell that is associated with the selected PLMN based on the one or more measurements.

Example 21A may include the method of example 19A, wherein the channel occupancy measurement is performed within a specified duration.

Example 22A may include the method of example 19A, wherein the one or more measurements include one or more of a synchronization signal reference signal received power (SS-RSRP), a synchronization signal reference signal received quality (SS-RSRQ), or a signal to interference and noise ratio (SINR).

Example 23A may include the method of example 19A, further comprising determining whether the best cell fulfills a cell selection criterion during camping.

Example 24A may include the method of example 23A, further comprising, in response to determining that the best cell does not fulfill the cell selection criterion, measuring one or more neighbor cells regardless of any measurement rules that limit measurement activities of the UE.

Example 25A may include the method of example 19A, wherein searching for cells that are determined to be better than the best cell based on the one or more measurements comprises evaluating neighbor cells to the best cell.

Example 26A may include the method of example 25A, wherein evaluating neighbor cells includes consideration of at least one of cell detection time, measurement interval, and cell evaluation time.

Example 27A may include the method of example 25A, further comprising monitoring intra-frequency carriers, inter-frequency carriers, frequency-division duplexing (FDD) evolved universal mobile telecommunications system (UMTS) terrestrial radio access (E-UTRA) inter-radio access technology (RAT) carriers, and time-division duplexing (TDD) E-UTRA inter-RAT carriers.

Example 28A may include an apparatus of a user equipment (UE), comprising: one or more processors configured to: select a public land mobile network (PLMN), wherein selecting the PLMN includes performing registration on the PLMN; and perform cell selection in New Radio (NR) unlicensed (NR-U) idle mode, wherein performing cell selection in NR-U idle mode comprises to: determine a best cell of a plurality of cells based on one or more measurements; analyze PLMN information associated with the best cell to thereby determine a particular PLMN associated with the best cell from a plurality of PLMNs; determine that the best cell is not associated with the selected PLMN based on the analyzed PLMN information; in response to determining that the best cell is not associated with the selected PLMN, determine a next best cell associated with the selected PLMN based on the one or more measurements; and camp on the next best cell; and a memory configured to store information associated with performing cell selection.

Example 29A may include the apparatus of example 28A, wherein the one or more measurements comprise at least one of reference signal received power (RSRP) and reference signal received quality (RSRQ).

Example 1B may include the method of NR-U idle mode cell selection and reselection, wherein the unlicensed carrier to be monitored can be up to UE itself.

Example 2B may include the method of NR-U idle mode cell selection and reselection, wherein the RSRP and RSRQ can be measured and evaluated for initial cell selection.

Example 3B may include the method of NR-U idle mode cell selection and reselection, wherein the other measurements on the channel occupancy is needed for cell reselection besides RSRP and RSRQ.

Example 4B may include the method of example 3B or some other example herein, wherein the detection, measurement and evaluation time can be used as the requirements metric for cell reselection.

Example 5B may include the method of example 4B or some other example herein, wherein these metric needs consider LBT failure.

Example 6B may include a method for a user equipment (UE) in a wireless network including a next generation NodeB (gNB) and the UE, the method comprising: monitoring a number of unlicensed carriers; measuring one or more signal qualities for the number of unlicensed carriers being monitored; and selecting an initial cell for the UE to operate based on the measured one or more signal qualities.

Example 7B may include the method of example 6B and/or some other example herein, wherein the number of unlicensed carriers being monitored is determined by the UE.

Example 8B may include the method of example 6B and/or some other example herein, wherein the one or more signal qualities includes one or more signal qualities for intra-frequency carriers, an inter-frequency carriers, FDD E-UTRA inter-RAT carriers, or TDD E-UTRA inter-RAT carriers.

Example 9B may include the method of example 6B and/or some other example herein, wherein the one or more signal qualities includes Reference Signal Received Power (RSRP), Reference Signal Received Quality (RSRQ).

Example 10B may include the method of example 9B and/or some other example herein, wherein the one or more signal qualities further includes Signal to Interference and Noise Ratio (SINR) or channel occupancy.

Example 11B may include the method of example 6B and/or some other example herein, wherein the number of unlicensed carriers are a number of subbands (SBs) of a wideband for a LBT operation performed by the gNB, or a number of carriers of a carrier aggregation (CA) for the LBT operation performed by the gNB.

Example 12B may include the method of example 11B or some other example herein, wherein the number of SBs of the wideband or the number of carriers of the CA are configured by Radio Resource Control (RRC) signaling from the gNB.

Example 13B may include the method of example 6B or some other example herein, wherein the UE does not support the number of unlicensed carriers being monitored.

Example 14B may include the method of example 6B and/or some other example herein, further comprising: checking whether the initial cell selected for the UE to operate in the number of unlicensed carriers belong to a registered Public Land Mobile Network (PLMN).

Example 15B may include the method of example 6B and/or some other example herein, further comprising: camping on to the selected initial cell; and performing further search for a better cell according to a cell reselection criteria.

Example 16B may include the method of example 6B and/or some other example herein, further comprising: measuring, periodically, Synchronization Signal based Reference Signal Received Power (SS-RSRP), Synchronization Signal based Reference Signal Received Quality (SS-RSRQ), Received Signal Strength Indicator (RSSI) level of a serving cell and evaluate a cell selection criterion for the serving cell.

Example 17B may include the method of example 16B and/or some other example herein, further comprising: measuring SS-RSRP and SS-RSRP on neighbor cells shall of the serving cell.

Example 18B may include the method of any of the examples 6B-17B and/or some other example herein, wherein the method is performed by an apparatus that is implemented in or employed by the UE.

Example 19B may include a method for a next generation NodeB (gNB) in a wireless network including the gNB and a user equipment (UE), the method comprising: determining a configuration for an uplink (UL) transmission resource for the UE with respect to a listen before talk (LBT) operation performed by the gNB on a number of unlicensed carriers; and indicating to the UE the configuration for the UL transmission resource subjected to the LBT operation.

Example 20B may include the method of example 19B and/or some other example herein, wherein the number of unlicensed carriers are a number of subbands (SBs) of a wideband for a LBT operation performed by the gNB, or a number of carriers of a carrier aggregation (CA) for the LBT operation performed by the gNB.

Example 21B may include the method of example 20B or some other example herein, wherein the number of SBs of the wideband or the number of carriers of the CA are configured by Radio Resource Control (RRC) signaling from the gNB.

Example 22B may include the method of example 19B and/or some other example herein, wherein the number of unlicensed carriers include intra-frequency carriers, an inter-frequency carriers, FDD E-UTRA inter-RAT carriers, or TDD E-UTRA inter-RAT carriers.

Example 23B may include the method of example 19B and/or some other example herein, further comprising: initiating the LBT operation; and determining a shared channel occupancy time (COT) for the LBT operation.

Example 24B may include the method of example 19B and/or some other example herein, further comprising: determining a cell selection criteria for the UE to select an initial cell to operate based on one or more measured signal qualities.

Example 25B may include the method of example 19B and/or some other example herein, wherein the one or more signal qualities includes Reference Signal Received Power (RSRP), Reference Signal Received Quality (RSRQ).

Example 26B may include the method of example 19B and/or some other example herein, further comprising: determining a cell reselection criteria for the UE to select an initial cell to operate based on one or more measured signal qualities.

Example 27B may include the method of example 19B-26B and/or some other example herein, wherein the method is performed by an apparatus that is implemented in or employed by the gNB.

Example 28B may include an apparatus comprising means to perform one or more elements of a method described in or related to any of examples 1B-27B, or any other method or process described herein.

Example 29B may include one or more non-transitory computer-readable media comprising instructions to cause an electronic device, upon execution of the instructions by one or more processors of the electronic device, to perform one or more elements of a method described in or related to any of examples 1B-27B, or any other method or process described herein.

Example 30B may include an apparatus comprising logic, modules, or circuitry to perform one or more elements of a method described in or related to any of examples 1B-27B, or any other method or process described herein.

Example 31B may include a method, technique, or process as described in or related to any of examples 1B-27B, or portions or parts thereof.

Example 32B may include an apparatus comprising: one or more processors and one or more computer-readable media comprising instructions that, when executed by the one or more processors, cause the one or more processors to perform the method, techniques, or process as described in or related to any of examples 1B-27B, or portions thereof.

Example 33B may include a signal as described in or related to any of examples 1B-27B, or portions or parts thereof.

Example 34B may include a datagram, packet, frame, segment, protocol data unit (PDU), or message as described in or related to any of examples 1B-27B, or portions or parts thereof, or otherwise described in the present disclosure.

Example 35B may include a signal encoded with data as described in or related to any of examples 1B-27B, or portions or parts thereof, or otherwise described in the present disclosure.

Example 36B may include a signal encoded with a datagram, packet, frame, segment, protocol data unit (PDU), or message as described in or related to any of examples 1B-27B, or portions or parts thereof, or otherwise described in the present disclosure.

Example 37B may include an electromagnetic signal carrying computer-readable instructions, wherein execution of the computer-readable instructions by one or more processors is to cause the one or more processors to perform the method, techniques, or process as described in or related to any of examples 1B-27B, or portions thereof.

Example 38B may include a computer program comprising instructions, wherein execution of the program by a processing element is to cause the processing element to carry out the method, techniques, or process as described in or related to any of examples 1B-27B, or portions thereof.

Example 39B may include a signal in a wireless network as shown and described herein.

Example 40B may include a method of communicating in a wireless network as shown and described herein.

Example 41B may include a system for providing wireless communication as shown and described herein.

Example 42B may include a device for providing wireless communication as shown and described herein.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An apparatus of a user equipment (UE), comprising:
one or more processors configured to:
perform cell re-selection associated with a selected public land mobile network (PLMN) in New Radio (NR) unlicensed (NR-U) idle mode, wherein performing the cell re-selection in NR-U idle mode comprises to:
determine a best cell associated with the selected PLMN based on one or more measurements, wherein at least one of the one or more measurements comprises a channel occupancy measurement;
camp on the best cell; and
periodically search for cells that are determined to be better than the best cell based on the one or more measurements; and
a memory configured to store information associated with performing the cell re-selection.

2. The apparatus of claim 1, wherein determining the best cell associated with the selected PLMN comprises to:
identify a candidate cell of a plurality of cells that is strongest based on the one or more measurements;
analyze PLMN information associated with the candidate cell to thereby determine a particular PLMN associated with the candidate cell from a plurality of PLMNs;
determine that the candidate cell is not associated with the selected PLMN based on the analyzed PLMN information; and
in response to determining that the candidate cell is not associated with the selected PLMN, determine the best cell that is associated with the selected PLMN based on the one or more measurements.

3. The apparatus of claim 1, wherein the channel occupancy measurement is performed within a specified duration.

4. The apparatus of claim 1, wherein the one or more measurements include one or more of a synchronization signal reference signal received power (SS-RSRP) and synchronization signal reference signal received quality (SS-RSRQ).

5. The apparatus of claim 1, wherein the one or more processors are further configured to determine whether the best cell fulfills a cell selection criterion during camping.

6. The apparatus of claim 5, wherein the one or more processors are further configured to, in response to determining that the best cell does not fulfill the cell selection criterion, measure one or more neighbor cells regardless of any measurement rules that limit measurement activities of the UE.

7. The apparatus of claim 1, wherein searching for cells that are determined to be better than the best cell based on the one or more measurements comprises evaluating neighbor cells to the best cell.

8. The apparatus of claim 7, wherein evaluating the neighbor cells includes consideration of at least one of cell detection time, measurement interval, and cell evaluation time.

9. The apparatus of claim 7, wherein the one or more processors are further configured to monitor intra-frequency carriers, inter-frequency carriers, frequency-division duplexing (FDD) evolved universal mobile telecommunications system (UMTS) terrestrial radio access (E-UTRA) inter-radio access technology (RAT) carriers, and time-division duplexing (TDD) E-UTRA inter-RAT carriers.

10. A method of a user equipment (UE) performing cell re-selection, the method comprising:
performing cell re-selection associated with a selected public land mobile network (PLMN) in New Radio (NR) unlicensed (NR-U) idle mode, wherein performing cell re-selection in NR-U idle mode comprises:
determining a best cell associated with the selected PLMN based on one or more measurements, wherein at least one of the one or more measurements comprises a channel occupancy measurement;
camping on the best cell; and
periodically searching for cells that are determined to be better than the best cell based on the one or more measurements.

11. The method of claim 10, wherein determining the best cell associated with the selected PLMN further comprises:
identifying a candidate cell of a plurality of cells that is strongest based on the one or more measurements;
analyzing PLMN information associated with the candidate cell to thereby determine a particular PLMN associated with the candidate cell from a plurality of PLMNs;
determining that the candidate cell is not associated with the selected PLMN based on the analyzed PLMN information; and
in response to determining that the candidate cell is not associated with the selected PLMN, determining the best cell that is associated with the selected PLMN based on the one or more measurements.

12. The method of claim 10, wherein the channel occupancy measurement is performed within a specified duration.

13. The method of claim 10, wherein the one or more measurements include one or more of a synchronization signal reference signal received power (SS-RSRP), a synchronization signal reference signal received quality (SS-RSRQ), or a signal to interference and noise ratio (SINR).

14. The method of claim 10, further comprising determining whether the best cell fulfills a cell selection criterion during camping.

15. The method of claim 14, further comprising, in response to determining that the best cell does not fulfill the cell selection criterion, measuring one or more neighbor cells regardless of any measurement rules that limit measurement activities of the UE.

16. The method of claim 10, wherein searching for cells that are determined to be better than the best cell based on the one or more measurements comprises evaluating neighbor cells to the best cell.

17. The method of claim 16, wherein evaluating the neighbor cells includes consideration of at least one of cell detection time, measurement interval, and cell evaluation time.

18. The method of claim 16, further comprising monitoring intra-frequency carriers, inter-frequency carriers, frequency-division duplexing (FDD) evolved universal mobile telecommunications system (UMTS) terrestrial radio access (E-UTRA) inter-radio access technology (RAT) carriers, and time-division duplexing (TDD) E-UTRA inter-RAT carriers.

19. An apparatus of a user equipment (UE), comprising:
one or more processors configured to:
select a public land mobile network (PLMN), wherein selecting the PLMN includes performing registration on the PLMN; and
perform cell selection in New Radio (NR) unlicensed (NR-U) idle mode, wherein performing cell selection in NR-U idle mode comprises to:
determine a best cell of a plurality of cells based on one or more measurements, wherein at least one of the one or more measurements comprises a channel occupancy measurement;
analyze PLMN information associated with the best cell to thereby determine a particular PLMN associated with the best cell from a plurality of PLMNs;
determine that the best cell is not associated with the selected PLMN based on the analyzed PLMN information;
in response to determining that the best cell is not associated with the selected PLMN, determine a next best cell associated with the selected PLMN based on the one or more measurements; and
camp on the next best cell; and
a memory configured to store information associated with performing cell selection.

20. The apparatus of claim 19, wherein the one or more measurements comprise at least one of reference signal received power (RSRP) and reference signal received quality (RSRQ).

* * * * *